Feb. 19, 1963    C. F. GRIMSEY, JR    3,077,958
ZERO THERMAL EXPANSION DEVICE
Filed Sept. 5, 1961    2 Sheets-Sheet 1
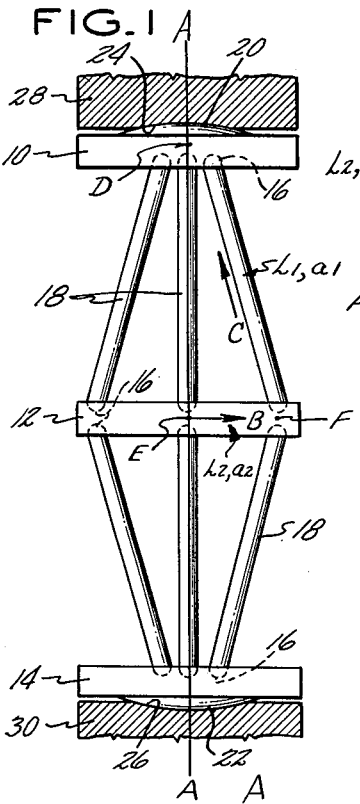
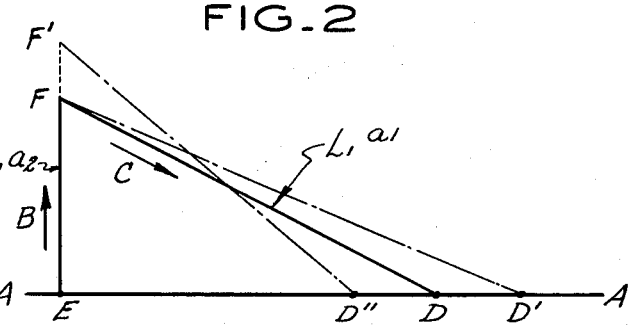
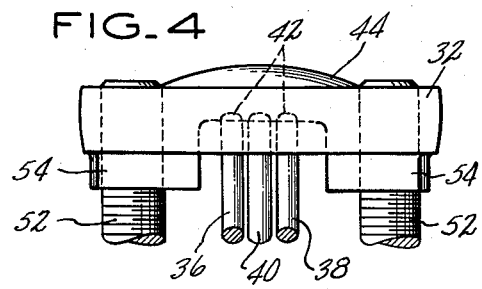
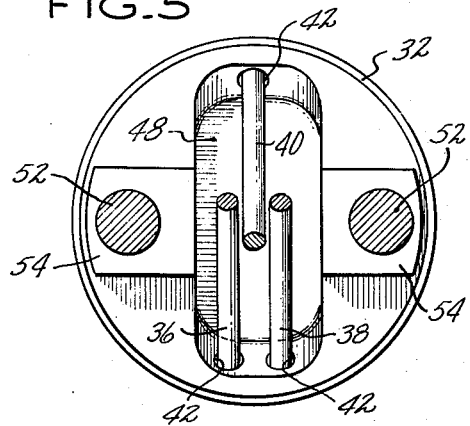
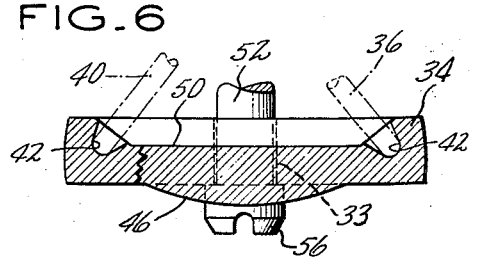
INVENTOR
CHARLES F. GRIMSEY, JR.
BY M. B. Tasker
ATTORNEY Feb. 19, 1963  C. F. GRIMSEY, JR  3,077,958
ZERO THERMAL EXPANSION DEVICE
Filed Sept. 5, 1961  2 Sheets-Sheet 2
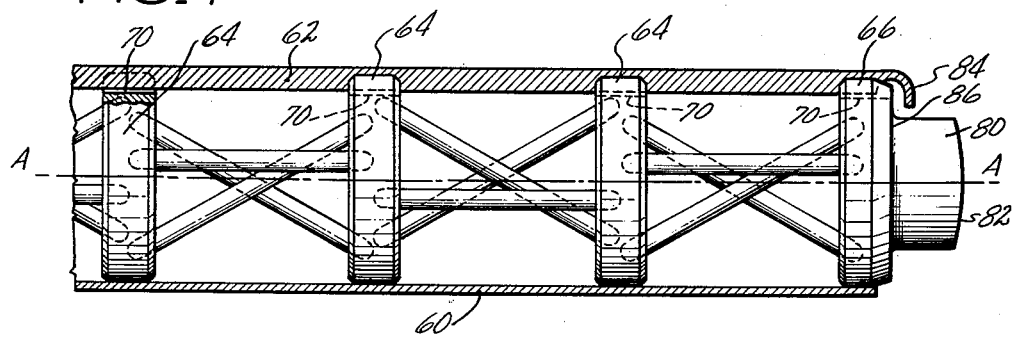
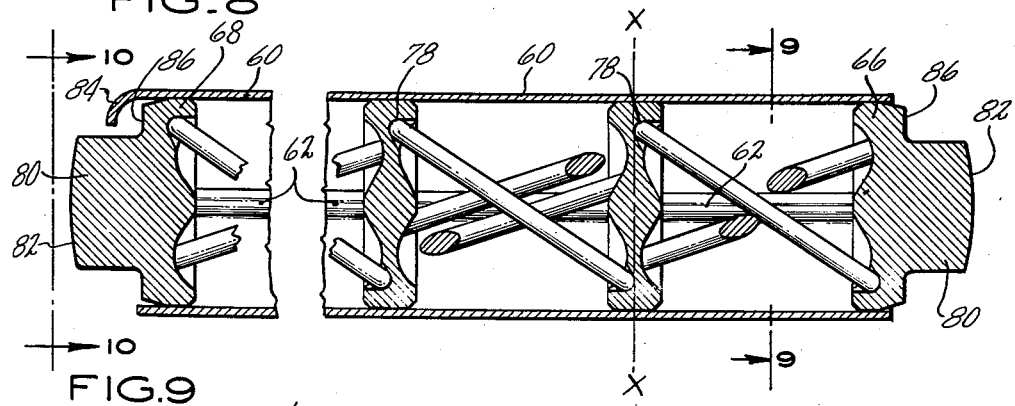
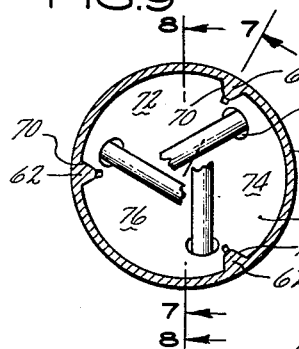
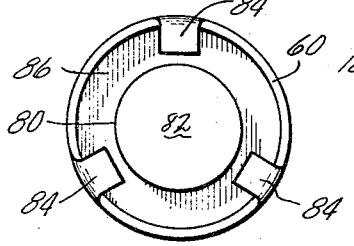
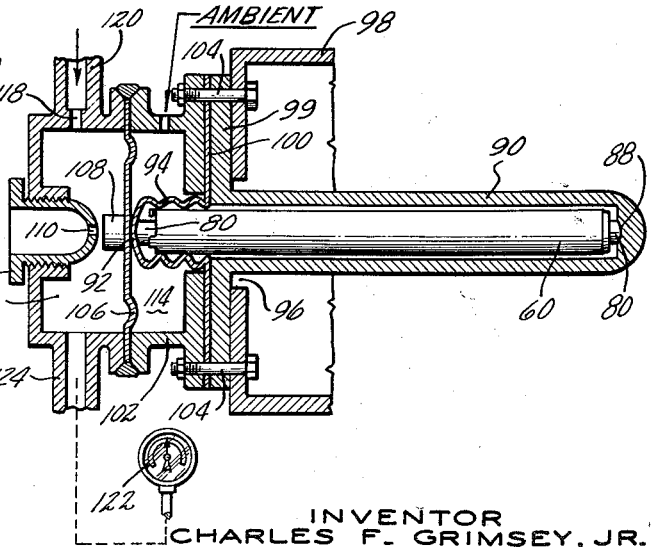
INVENTOR
CHARLES F. GRIMSEY, JR.
BY M. B. Tasker
ATTORNEY

United States Patent Office 3,077,958
Patented Feb. 19, 1963

3,077,958
ZERO THERMAL EXPANSION DEVICE
Charles F. Grimsey, Jr., Essex, Conn., assignor to United Aircraft Corporation, East Hartford, Conn., a corporation of Delaware
Filed Sept. 5, 1961, Ser. No. 136,098
18 Claims. (Cl. 189—34)

This invention relates to a motion-transmitting device having a controllable coefficient of thermal expansion, and it is an object of this invention to provide such a device.

Herein the invention is disclosed, in one of its many applications, in connection with a temperature sensor in which the movement of the expansible element, usually a tube, has heretofore been transmitted to the temperature indicator through a rod located within the tube and hence subjected to the same extremes of temperature as the tube. In order that the movements of the tube resulting from temperature changes in its environment may be transmitted to the temperature indicator proportionately, it is necessary that the rod have a zero coefficient of thermal expansion; otherwise, the temperature reading on the indicator must be corrected for the error due to expansion and contraction of the rod.

It is a further object of this invention to provide a motion-transmitting device which simulates a rod comprised of a material having a zero coefficient of thermal expansion.

A still further object of this invention is to provide a device of this type which is particularly well-adapted for use in temperature sensors used under conditions of extreme temperature changes.

These and other objects and advantages of the invention will become apparent or will be pointed out in connection with the following detailed description of several embodiments of the invention shown in the accompanying drawings.

FIG. 1 is a side elevation of one form of the invention;

FIG. 2 is a diagram illustrating the principle of operation of the device of FIG. 1;

FIG. 3 is a side elevation, partly in section, of a modified form of the invention;

FIG. 4 is a detailed view taken on line 4—4 of FIG. 3;

FIG. 5 is a sectional view taken on line 5—5 of FIG. 3;

FIG. 6 is a detail, partly in section, of the lowermost disc of FIG. 3;

FIG. 7 is a longitudinal sectional view of a modified construction taken on lines 7—7 of FIG. 9;

FIG. 8 is a longitudinal sectional view taken on line 8—8 of FIG. 9;

FIG. 9 is a transverse sectional view taken on line 9—9 of FIG. 8;

FIG. 10 is an end view taken on line 10—10 of FIG. 8; and

FIG. 11 is a vertical sectional view through a temperature sensor, including a zero-expansion device of FIGS. 7 through 10.

Referring to FIG. 1, the zero-expansion device consists of three parallel axially spaced discs 10, 12 and 14. These discs have in their confronting faces three sockets 16 which receive the rounded ends of a plurality of rods 18. It will be noted that the sockets 16 in the discs 10 and 14 are located as close as practicable to the longitudinal axis A—A of the device, these sockets being equally spaced from the axis and 120° apart. The sockets 16 in the opposite surfaces of the middle disc 12, however, are located close to the periphery of the disc. These sockets are located 120° apart and lie in the same radial planes as the sockets in the confronting surfaces of the discs 10 and 14.

The outer surfaces of discs 10 and 14 are formed with convex surfaces 20 and 22 which are received in mating concave surfaces 24 and 26 of members 28 and 30 between which the zero-expansion device is held in compression. It will be noted that surfaces 20, 22, 24 and 26 are concentric about the major axis A—A.

In accordance with this invention, the rods 18 are made of a material having a relatively low coefficient of thermal expansion such as pure tungsten. The discs, and particularly the disc 12, are made of a material having a higher coefficient of thermal expansion than the rods 18, such as one of the stainless steels.

Referring to FIGS. 1 and 2, it will be evident that an effective coefficient of expansion of zero can be had along axis A—A if $L_1$, $a_1$ and $L_2$, $a_2$ are matched both as regards their length and their coefficient of expansion, where $L_1$ is the length of the rod from F to D and $a_1$ is the coefficient of thermal expansion of the material of the rod, and $L_2$ is the radial distance on disc 12 from E to F and $a_2$ is the coefficient of expansion of the material of the disc. Thus, the linear expansion of $L_1$, considered alone in the direction C, will lengthen ED to ED' (FIG. 2), while the expansion of $L_2$, considered alone in direction B, shortened ED to ED''. Therefore, by the proper selection of lengths and expansion coefficients, the shortening effect, due to the expansion of the disc 12, can be made to equal the lengthening effect of the rod 18.

If extreme accuracy is required, the two materials chosen for the rods and discs should have similar average-expansion coefficients versus temperature curves. Since most engineering materials have average coefficients of thermal expansion which vary with temperature, the "$a$" curves of the two materials should be parallel. This is the case, for example, for 316 stainless steel and pure tungsten.

It will be evident that by another set of choices of lengths and expansion coefficients, either a negative or a positive coefficient of thermal expansion of the device can be achieved and such a construction is within the scope of this invention. For purposes of illustration, however, the device has been illustrated and described in connection with a temperature sensor in which it is desired to have a zero coefficient of thermal expansion of the device. The device of FIG. 1 will accomplish this, since the discs 10 and 14 will remain at a constant axial distance over a wide range of temperature variation.

In FIGS. 3 to 6, a modified construction is shown in which a pair of discs 32 and 34 are provided which are connected by three rods 36, 38 and 40. The rods 36 and 38 are received in suitable sockets 42 in the discs and extend diagonally across the center line A—A, while the rod 40, which is received in a similar socket in each of the discs, extends diagonally across the center line in the opposite direction and lies between rods 36 and 40. It will be clear from FIGS. 4 and 5 that the three rods and their sockets lie in three parallel planes and, accordingly, are capable of taking compression forces exerted on the discs. Discs 32 and 34 are provided with crowned ends 44 and 46 for mounting the device, as in FIG. 1. Also, the discs are cut away on the confronting faces to provide recesses 48 and 50, to enable the bottoms of the sockets to lie in medial planes through the discs in the event that more than one unit is provided. This will be made clear in connection with the following showing of FIGS. 7 through 10.

A pair of studs 52 extend through openings 33 in disc 34 and are threaded into bosses 54 in disc 32, the heads 56 of the studs bearing against the outer face of disc 34. These studs serve to temporarily hold the device assembled until it is placed in use after which they are removed. This form of the invention operates in the same manner as FIG. 1, the radial expansion of the discs compensating for the longitudinal expansion of the rods.

In FIGS. 7 through 10, still another form of the invention has been shown, in which a plurality of units are assembled in a tube 60 which is provided with three internal longitudinally extending ribs 62 (FIG. 9). These ribs are located 120° apart and serve to locate a plurality of identical intermediate discs 64 and two end discs 66 and 68. These discs all have peripheral notches 70 by which they are positioned against rotation in the tube by the ribs 62. The notches 70 divide the periphery of these discs into three lobes, or peripheral segments, 72, 74 and 76. The discs are cut away on their confronting faces to permit the sockets 78 to extend inwardly to a median line X—X (FIG. 8), so that the expansion of the discs along the longitudinal axis A—A (FIG. 7) will not affect the accuracy of the device.

In this form of the invention the rods are seated in sockets 78 in the confronting faces of adjacent discs as before, three rods being provided between each pair of discs. The rods, however, are differently arranged to provide a more stable platform. As shown in FIG. 9, a socket 78 is provided in the left-hand corner of each peripheral segment 72, 74 and 76, adjacent its notches 70. The position of the rods relative to the discs can best be understood by describing the method of assembling the discs in the tube. Since each pair of discs and its connecting rod are identical, only one pair will be considered; for example, discs 64 and 66. With discs 64 inserted in the tube and disc 66 held in the angular position thereof in which all three rods are parallel, the notches in disc 66 will be 60° out of position to mesh with the ribs 70 in the tube. This is due to the fact similar faces of the two discs confront each other and the sockets are hence located on opposite sides of the confronting segments. By rotating the disc 66 counterclockwise, as viewed in FIG. 7, through an angle of 180°, the notches 70 will be in register with ribs 62 of tube 60 and disc 66 can be inserted axially within the tube. The units are assembled in this manner, except that the disc corresponding to disc 66 of the next unit to be inserted in the tube will be rotated clockwise. This provides the alternate positions of the rods and discs shown in FIG. 7.

The end discs 66 and 68 are provided with axial bosses 80 of reduced diameter which terminate in convex ends 82. Tube 60 is also provided with three tabs 84 at each end which, after final assembly of the device, are bent inwardly over the shoulder 86 formed by the reduced diameter of bosses 80 to prevent displacement of the discs and rods in the tube while providing complete freedom of the units from the axial expansion of tube 60.

In FIG. 11 the zero-expansion device of FIGS. 7 through 10 is shown installed in a temperature sensor, the convex ends 82 of bosses 80 being received between corresponding opposed concave surface 88 of a temperature-responsive tube 90 and a concave surface 92 of a corrugated expansible element 94. Tube 90 is inserted through an opening 96 in a casing 98 and has an integral annular flange 99 which overlies the external wall of the casing. Expansible element 94 also has a circular flange 100 which is clamped between flange 99 and a diaphragm housing 102, peripheral bolts 104 being provided to clamp the whole in fluid-tight relationship.

The end of expansible element 94 abuts a flexible diaphragm 106, which carries a movable valve member 108 in position to control an orifice 110 in a threaded axially adjustable thimble 112. Diaphragm 106 is welded between parts of housing 102 to seal off chamber 114, which is vented to atmosphere from chamber 116, which is supplied with a source of constant pressure air through a restriction 118 in inlet pipe 120. A temperature indicator 122 which is responsive to pressure variations in chamber 116 is connected to this chamber by a pipe 124.

It will be evident that, since the zero-expansion device in tube 90 does not change its length as a result of temperature changes which affect changes in the length of the tube 90, the valve 108, 110 will be directly responsive to temperature changes within casing 98. Accordingly, the air pressure in chamber 116, which is shown on indicator 122 in terms of temperature, will correctly reflect the temperature in casing 98.

It will be evident from the above description that a zero-expansion device has been provided which is of small diameter and hence adaptable to many uses such as the temperature sensor illustrated. It will also be evident that the device can be made to have any desired coefficient of thermal expansion, either positive or negative, by selection of suitable dimensions and materials for the discs and the rods.

While the devices shown and described herein represent the preferred embodiment of the invention, it will be understood that numerous changes may be made in the construction and arrangement of the parts without exceeding the scope of the invention as defined by the following claims.

I claim:

1. A zero-expansion actuating member comprising a plurality of parallel axially spaced discs having one coefficient of thermal expansion and a plurality of rods between each pair of discs having their ends pivotally associated with confronting surfaces of said discs, said rods having a different coefficient of thermal expansion from said discs, said rods having their axes inclined with respect to the longitudinal axis extending through said discs, said coefficients being so chosen that the expansion of said discs in the plane of the latter compensates for the expansion of said rods along their lengths.

2. An elongated zero-expansion actuating member comprising a plurality of parallel axially spaced discs formed of a material having a relatively high coefficient of thermal expansion, and a plurality of rods having their ends pivotally associated with confronting surfaces of said discs formed of a material having a relatively low coefficient of thermal expansion, said rods being inclined with respect to the longitudinal axis extending through said discs, the material of said discs and said rods being so selected that the radial expansion of said discs compensates for the longitudinal expansion of said rods to maintain said discs at the same axial spacing over a wide temperature range.

3. A zero-expansion actuating member comprising a plurality of parallel axially spaced discs having a relatively high coefficient of thermal expansion, and a plurality of rods having their ends seated in sockets in confronting surfaces of said discs having a lower coefficient of thermal expansion, said rods being inclined with respect to the surfaces of said discs, the expansion of said discs and rods being so chosen that the radial expansion of said discs compensates for the expansion of said rods along their length.

4. An elongated structural member having a controlled coefficient of thermal expansion along its major axis including a pair of axially spaced discs having parallel confronting surfaces provided with sockets and at least three rods having rounded ends seated in said sockets, each of said rods being inclined with respect to the planes of said discs, the materials of said discs and said rods being so selected that the radial expansion of said discs and the longitudinal expansion of said rods will produce the desired axial coefficient of expansion of said member.

5. An elongated structural member having a zero coefficient of thermal expansion along its major axis including a pair of axially spaced discs having parallel confronting surfaces provided with sockets and at least three rods having rounded ends seated in said sockets, each of said rods being inclined with respect to the planes of said discs, said discs having a coefficient of linear expansion greater than that of said rods.

6. An elongated structural member having a zero coefficient of thermal expansion along its major axis including a pair of axially spaced discs having parallel confronting surfaces provided with sockets and at least three rods having their opposite ends seated in said sockets, said rods having their longitudinal axes inclined with respect to the major axis of said member, the material comprising said discs and said rods being selected from materials having different coefficients of thermal expansion so that the radial expansion of said discs just compensates for the longitudinal expansion of said rods and the spacing of said discs remains substantially constant over a wide range of temperature variation.

7. An elongated zero-expansion device having a pair of axially spaced discs formed of a material having a relatively high coefficient of thermal expansion, and at least three rods formed of a material having a relatively low coefficient of thermal expansion, said rods having rounded ends received in sockets formed in the confronting surfaces of said discs, the sockets in one of said discs being formed near its periphery and the sockets in the other disc being formed nearer the longitudinal axis of said device, whereby said rods are inclined relative to said axis, the material of said discs and said rods being chosen so that the radial expansion of said discs compensates for the longitudinal expansion of said rods and maintains said discs at a constant axial spacing over a wide temperature range.

8. An elongated zero-expansion device having three parallel axially spaced discs formed of a material having a relatively high coefficient of thermal expansion, and a plurality of rods having their ends pivotally associated with confronting surfaces of said discs formed of a material having a relatively low coefficient of thermal expansion, at least three rods being provided between each pair of confronting surfaces, said rods having rounded ends which are received in sockets in said surfaces, the sockets in the surfaces of the intermediate disc being located about its periphery and the sockets in the terminal discs being located closer to the longitudinal axis of said discs, the material of said discs and said rods being so selected that the radial expansion of said discs compensates for the longitudinal expansion of said rods and maintains said discs at a constant axial spacing over a wide temperature range.

9. An elongated structural member having a zero coefficient of thermal expansion along its major axis including a pair of axially spaced discs having parallel confronting surfaces provided with sockets and at least three rods having rounded ends seated in said sockets, the opposite ends of each rod being seated in sockets on opposite sides of the major axis of said member, said discs having a coefficient of thermal expansion greater than said rods so that the radial expansion of said discs compensates for the longitudinal expansion of said rods.

10. A member as claimed in claim 9 in which the rods lie in parallel planes.

11. A member as defined in claim 9 in which the discs are provided with crowned ends adapted to be received between two socketed members.

12. A member as defined in claim 9 in which the discs are connected by two removable threaded fasteners.

13. An elongated structural member including a tube, a plurality of parallel axially spaced discs in said tube disposed in planes normal to the major axis of said tube, said discs having confronting equally spaced surfaces, and a plurality of rods inclined with respect to the longitudinal axis of said tube having their ends pivotally associated with the confronting surfaces of adjacent discs.

14. A structural member as claimed in claim 13 in which the tube is provided with three longitudinal ribs spaced 120° apart and the discs are provided with three peripheral notches spaced 120° apart.

15. A structural member as claimed in claim 14 in which the peripheral segments of the discs between the notches are each provided with one socket located adjacent one side of the segment in which the ends of the rods are received.

16. A structural member as claimed in claim 15 in which each successive disc in the tube beginning at one end of the tube is displaced 120° from the previous disc.

17. A structural member as claimed in claim 15 in which the bottoms of the sockets in opposite sides of each disc lie in the same transverse plane through the disc.

18. A structural member as claimed in claim 17 in which the terminal discs at each end of the tube have an external axial boss provided with a convex end portion.

No references cited.